C. E. JOHNSON AND N. E. BROWN.
BRAZED ROTOR CONSTRUCTION.
APPLICATION FILED JUNE 1, 1920.
1,433,622.  Patented Oct. 31, 1922.
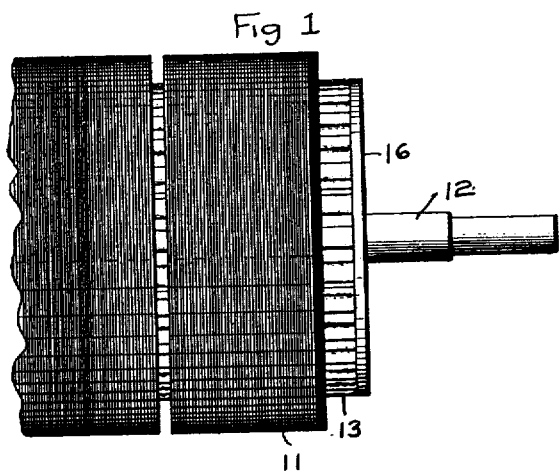
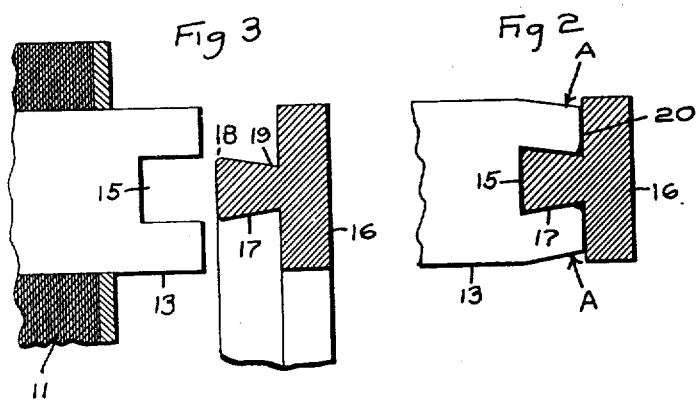
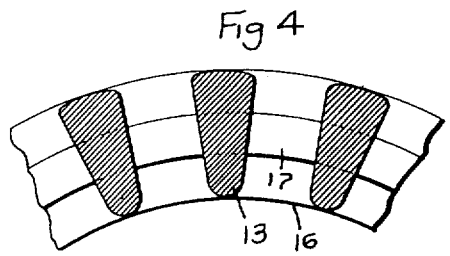
INVENTORS
CARL E. JOHNSON
NICHOLAS E. BROWN
By Graham + Harris
ATTORNEYS Patented Oct. 31, 1922.

1,433,622

UNITED STATES PATENT OFFICE.

CARL E. JOHNSON AND NICHOLAS E. BROWN, OF LOS ANGELES, CALIFORNIA, ASSIGNORS TO U. S. ELECTRICAL MANUFACTURING CO., A CORPORATION OF CALIFORNIA.

BRAZED ROTOR CONSTRUCTION.

Application filed June 1, 1920. Serial No. 385,774.

*To all whom it may concern:*

Be it known that we, CARL E. JOHNSON and NICHOLAS E. BROWN, both citizens of the United States, residing at Los Angeles, county of Los Angeles, and State of California, have invented a new and useful Improvement in Brazed Rotor Constructions, of which the following is a specification.

My invention relates to dynamo electric machinery and is particularly applicable to induction motors having a bar type secondary or rotor. Such rotors consist of a series of annular sheet steel punchings built up on a shaft and perforated with slots near the periphery through which conductors pass. These conductors are joined at each end to a common end ring. For the purpose of insuring a good conductivity at the junction between the end rings and the conducting bars, it is common practice to braze the bars to the end rings and our invention relates more particularly to the method of securing the bars to the end rings so as to insure a perfect joint therewith and to provide a mechanical connection which will mechanically hold the bars and end ring together independent of said brazing.

Further objects and advantages will be made evident hereinafter.

Referring to the drawing which is for illustrative purposes only,

Fig. 1 is a side view of the portion of a rotor embodying my invention.

Fig. 2 is a view on an enlarged scale showing the finished joint between the end ring and the conductor.

Fig. 3 is a diagram showing the form of the bar and end ring before they are secured together.

Fig. 4 is a section on a plane represented by the line 4—4 of Fig. 2.

In the form of the invention shown, punchings 11 are assembled on the shaft 12 having slots through which conducting bars 13 extend, these bars projecting beyond the punchings at either end thereof. As initially formed, each of the bars 13 has a rectangular slot 15 formed therein. End rings 16 are provided at each end of the rotor, these end rings having a cylindrical ridge 17 formed on the side thereof, this ridge being of keystone shape so that the point 18 is somewhat thicker than the base 19. The method of assembling the rotor is as follows:

The bars 13 being placed in the slots in the punchings 11, the end rings 16 are placed with the ridge 17 in the slot 15. Pressure is then applied in the direction of the arrows A—A of Fig. 2 thus bending the portions of the bars 13 on either side of the slot 15 and forcing them inwardly so that they are mechanically interlocked with the ridge 17 and in the position shown in Fig. 2. The bar 13 is then brazed to the end ring 16 and the ridge 17, the brazing material being shown in black at 20 in Fig. 2. The bars used are preferably of keystone shape as shown in Fig. 4, but bars having parallel sides with or without rolled edges may be used if desired.

It will be noted that by the use of our invention it is possible to mechanically interlock the bars 13 with and secure them to the end ring 16 quite independent of the brazing material and if considerable pressure is exerted along the direction of the arrow A—A, a quite intimate contact is produced between the end of the bar 13 and the ring 16. It is possible by the use of this method to secure both end rings to the bars very solidly so that the brazing operation is greatly facilitated and so that the completed rotor has very great mechanical strength.

I claim as my invention:

1. In a dynamo electric machine, the combination of a slotted core, conducting bars extending through and projecting from the slots in said core at either end thereof, each end of such bar having a slot formed therein, and two conducting end rings, each end ring have a cylindrical ridge formed thereon of proper diameter to fit in the slots in one end of each bar having a slot formed therein. said ridge being thicker at the point than at the base so that the bars may be mechanically interlocked therewith independent of said brazing.

2. In a dynamo electric machine, the combination of a slotted core. conducting bars extending through and projecting from the slots in said core at either end thereof, each end of each bar having a slot formed therein. and two conducting end rings, each end ring, having a cylindrical ridge formed thereon of proper diameter to fit in the slots in one end of all the bars and be brazed thereto, said ridge being thicker at the point than at the base so that the bars may be distorted to mechanically engage therewith independent of said brazing.

3. In a dynamo electric machine, the combination of a slotted core; conducting bars extending through and projecting from the slots in said core at either end thereof, each end of each bar having an opening formed therein; and an end ring of substantially T shaped section having one branch of said T fitting in said openings, the branch of said T fitting in said openings, being thicker at its outer end than at its base so that the ends of the bars may be crimped thereon.

4. In a dynamo electric machine, the combination of a slotted core; conducting bars extending through and projecting from the slots in said core at either end thereof, each end of each bar having an opening formed therein; and an end ring having a keystone shaped section fitting in said openings, the ends of the bars being bent down to crimp on said keystone section.

In testimony whereof, we have hereunto set our hands at Los Angeles, California, this 26th day of May, 1920.

CARL E. JOHNSON.
NICHOLAS E. BROWN.